United States Patent Office 3,567,684
Patented Mar. 2, 1971

3,567,684
AMINO-POLYAMIDE ESTER ADHESIVE BINDERS
Gerfried Pruckmayr, Wilmington, Del., assignor to E. I. du Pont de Nemours and Company, Wilmington, Del.
No Drawing. Filed July 26, 1966, Ser. No. 567,863
Int. Cl. C08g 20/00, 29/32
U.S. Cl. 260—47
6 Claims

ABSTRACT OF THE DISCLOSURE

Amino-polyamide esters consisting essentially of recurring units of the formula

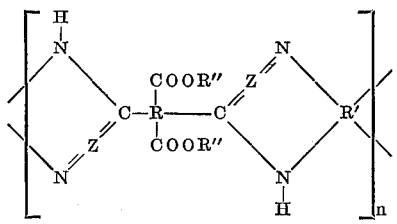

where R is a tetravalent carbocyclic aromatic radical, R' is a tetravalent aromtic or cycloliphatic radical, R" is a monovalent aliphatic, cycloaliphatic, or aromatic radical and =Z= represents a structure selected from the group consisting of (1) that in which $H_2$ is bonded to the N, as in the —$NH_2$ group, and O is bonded to the C, as in the >C=O group, and
(2) that in which the —$NH_2$ group from (1) above is condensed with the >C=O group from (1) above to leave a double bond joining N and C, as in the

—N=C— group, with the proviso that less than all —$NH_2$ groups have condensed with >C=O groups, and $n$ is an integer, said polymers having melting points between 50° C. and 250° C., and inherent viscosities in solution at 0.5 weight percent concentration and 30° C. of less than 0.2 are useful as high temperature adhesive binders.

This invention relates to a new type of low-melting amino-polyamide ester which can be converted thermally or chemically to infusible and insoluble heterocyclic polymers. The infusible and insoluble polyheterocyclic structures are described in the patent application of Robert Michael Paufler, U.S.S.N. 338,569 filed January 20, 1964 now abandoned. The meltable prepolymers described herein are especially suitable for use as high temperature metal adhesives, laminates, etc.

The preparation of the intractable polymers disclosed by Paufler starts with a dianhydride and a tetramine. In the first reaction step a polyamide-acid is formed which is soluble in certain high-boiling polymer solvents. However, it does not have a melting point and cyclizes on heating to form the infusible and insoluble amino-poly-imides, and finally the keto-pyrrolo-imidazole structures shown below:

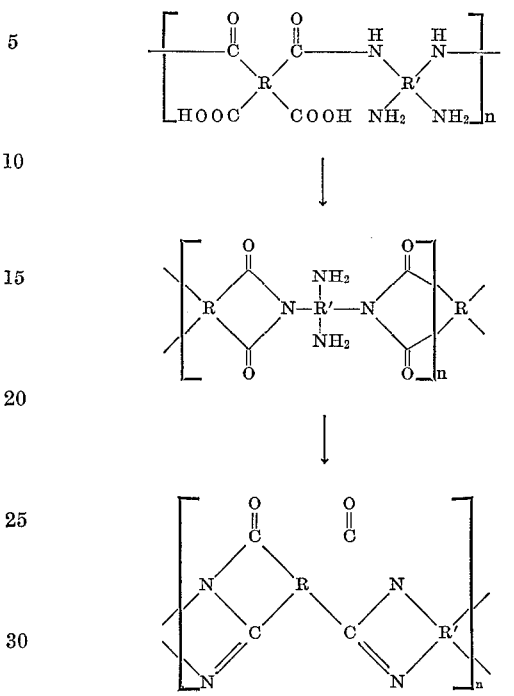

For certain applications, particularly in the field of metal adhesives, it is essential that the adhesive is meltable and will wet the surface of the substrate completely. The above system can be modified to produce low-melting prepolymers, which after curing give strong and thermally stable metal-to-metal bonds. In this modified procedure the condensation takes a different course. A tetraester is polymerized with a tetramine in the melt or in a suitable solvent. The polymerization is interrupted at an early stage and the resulting meltable prepolymer, an amino-amide-ester, is obtained which can be used directly as an adhesive. On curing at elevated temperatures, a benzimidazole-ester is formed, rather than the polyamino-imide formed from the dianhydride as shown by the IR spectra. In the final step a polybenzobenzimidazole, or poly-keto-pyrroloimidazole structure is obtained by elimination of phenol or other hydroxy compounds as illustrated below:

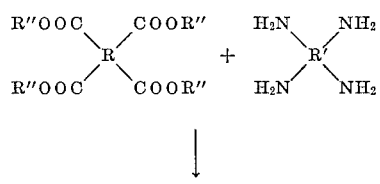

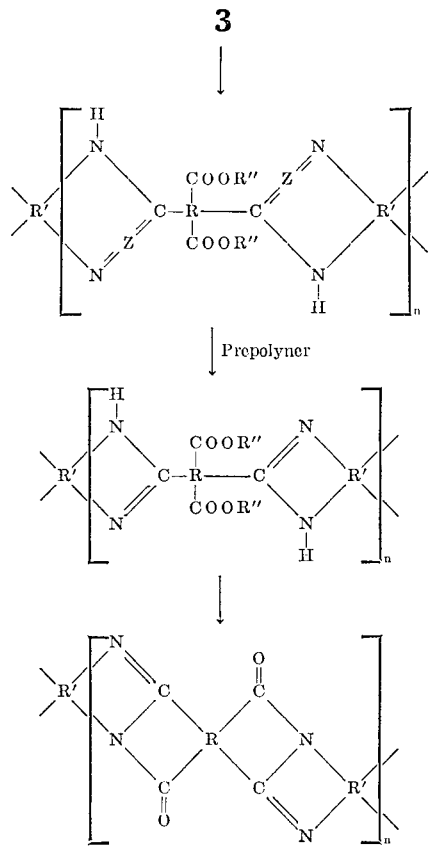

| Prepolymer

In the preceding formulas R is a tetravalent radical containing at least two carbon atoms, preferably a tetravalent aromatic structure, R' is an aromatic or cycloaliphatic tetravalent radical, and R'' is a monovalent aliphatic, cycloaliphatic or aromatic radical, and =Z= represents $H_2$ bonded to N and O bonded to C, with the proviso that some but less than all the $NH_2$ groups may have condensed with the CO groups to leave a double bond joining N and C. In other words, the amino-amide-ester prepolymer consists essentially of recurring units selected from the group consisting of the formulae (a)

(b)

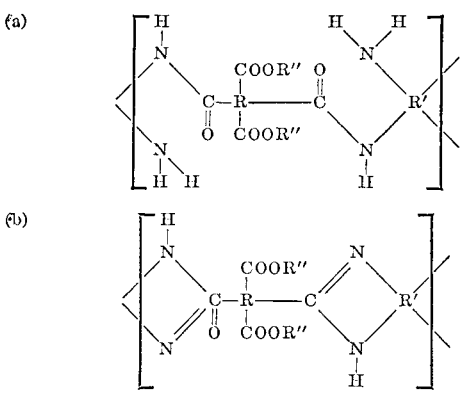

where R is a tetravalent carbocyclic aromatic radical, R' is a tetravalent carbocyclic aromatic or cyclo aliphatic radical, R'' is a monovalent aliphatic, cycloaliphatic, or carbocyclic aromatic radical, and less than all of the recurring units are of Formula b.

The process for preparing the amino-amide-ester prepolymers comprises reacting at least one tetramine with at least one tetraester in an inert solvent or in the melt, with or without a suitable catalyst. The tetramine and the tetraester are reacted in substantially equimolar quantities. The polymerization is carried out under an inert atmosphere, normally at temperatures ranging from 200° C. to 300° C. The reaction is discontinued before the inherent viscosity of the reaction product exceeds 0.2, measured as a 0.5% solution in any suitable solvent at 30° C. Inherent viscosity is defined as $$\eta_{inh} = l_\eta \left[ \frac{\eta_{rel}}{c} \right]$$

where $$\eta_{rel} = \frac{\eta \text{ solution}}{\eta \text{ solvent}}$$

$c$ = concentration of polymer in grams per 100 ml. solution.

The prepolymer is obtained in the form of a solid material, with a melting point between 50° C. and 250° C., preferably between 100° C. and 200° C.

The aromatic esters used in this invention are characterized by the formula:

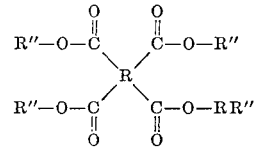

wherein R is an aromatic tetravalent organic radical, such as,

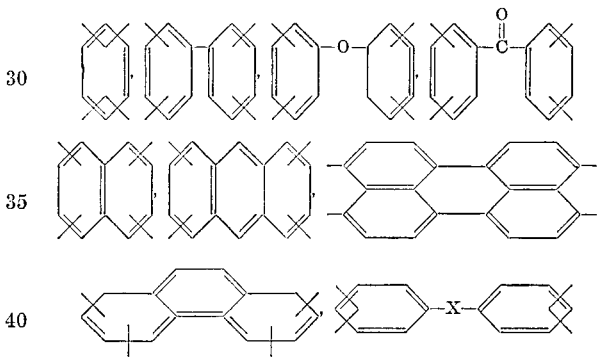

and the like, with the four carbonyl groups being attached directly to separate carbon atoms in an aromatic ring, and each pair of carbonyl groups being in the ortho position to each other, i.e.,

or the peri position, i.e.,

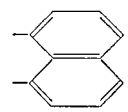

R'' is either an aryl radical, such as phenyl, biphenyl, napthyl, crysyl, dichlorophenyl, etc. or an alkyl radical such as methyl, ethyl, butyl, etc. Preferably, R'' is phenyl. Illustrative aromatic esters suitable for use in this invention include:

tetraphenyl benzophenone-3,3',4,4'-tetracarboxylate,
tetranaphthyl benzophenone-3,3',4,4'-tetracarboxylate,
tetraethyl benzophenone-3,3',4,4'-tetracarboxylate,
tetraphenyl-3,3',4,4'-oxydiphthalate,
tetraphenyl pyromellitate,
tetramethyl pyromellitate,
tetracresyl pyromellitate,
tetrabutyl diphenylmethane-3,3',4,4'-tetracarboxylate,
tetra m-chlorophenyl diphenylmethane-3,3',4,4'-
  tetracarboxylate,
tetra p-chlorophenyl diphenylmethane3,3',4,4'-
  tetracarboxylate,
tetra (biphenyl) chlorophenyl diphenylmethane-3,3',4,4'-
  tetracarboxylate, tetraphenyl diphenyl difluoromethane-3,3',4,4'-tetracarboxylate,
tetra m-ethoxyphenyl diphenyl sulfone-3,3',4,4'-tetracarboxylate,
tetra p-ethoxyphenyl diphenyl sulfone-3,3',4,4'-tetracarboxylate,
tetraphenyl diphenyl-3,3',4,4'-tetracarboxylate,
tetracresyl diphenyl-2,3,3',4'-tetracarboxylate,
tetraphenyl naphthalene-1,4,5,8-tetracarboxylate and the tetraesters of
2,2-bis(3,4-dicarboxyphenyl) propane, and
2,2-bis(3,4-dicarboxylphenyl)-1,1,1,3,3,3-hexafluoropropane,
tetraphenyl-2,3,6,7-naphthalene tetracarboxylate,
tetraphenyl-3,4,9,10-perylene tetracarboxylate,
tetraphenyl 2,6-dichloronaphthalene-1,4,5,8-tetracarboxylate, tetraphenyl - 2,3,6,7 - tetrachloronaphthalene-1,4,5,8-tetracarboxylate, tetraphenyl phenanthrene - 1,8,9,10-tetracarboxylate, and the like. More than one of such aromatic esters can be used if desired.

Examples of tetra-amino compounds from which R' stems are 3,3'-diaminobenzidine; bis(3,4 - diamino phenyl) methane; 1,2-bis(3,4 - diamino phenyl) ethane; 2,2-bis (3,4-diamino phenyl) propane; bis(3,4-diamino phenyl) ether; bis(3,4-diamino phenyl) sulfide; bis(3,4-diamino phenyl) sulfone; 3,4,3',4'-tetra - amino diphenyl; 1,2,4,5-tetra-amino benzene; 2,3,6,7-tetra-amino naphthalene; etc.; and the corresponding ring-hydrogenated tetra-amines.

As already mentioned, the prepolymers described in this invention are especially useful as high-temperature metal adhesives. They can be applied as the dry powders to the substrate, or a solution in a suitable solvent, or in the form of an impregnated glass cloth. After an adequate curing, as described in more detail in Example II, the resulting bonds showed lap shear strengths of up to 2400 p.s.i. at room temperature and up to 1600 p.s.i. at 300° C.

The following examples will further illustrate this invention.

EXAMPLE I 3.31 grams of 3,3',4,4'-benzophenone tetracarboxylic acid tetraphenyl ester, which is of the formula

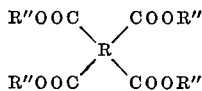

in which R is

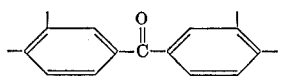

and R'' is phenyl, were mixed thoroughly with 1.07 g. of 3,3'-diaminobenzidine, which is of the formula

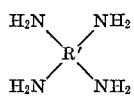

in which R' is

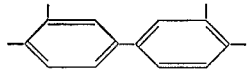

The mixture was placed into a small resin kettle, which was immersed into a preheated silicon oil bath. The bath temperature was kept constant at 200° C. A slow stream of nitrogen was passed through the kettle during the entire reaction. After 25 minutes the clear brown melt was cooled to room temperature. The solidified glassy material was powdered, and had a softening point of 120–120° C. and an inherent viscosity in phenol of less than 0.2. This amino-amide-ester prepolymer was used directly as a metal adhesive, as described in the following example.

If the polymerization is carried to completion by increasing the reaction temperature slowly up to 350° C., an infusible and insoluble polymeric material results.

The thermal stability of this product was determined by thermogravimetric analysis in air at a heating rate of 12° C./min. and the following weight loss was recorded:

400° C.—0%, 450° C.—1%, 500° C.—5%, 550° C.—12%, 600° C.—25%

EXAMPLE II

This example illustrates the use of the prepolymers of this invention as adhesives:

Strips of stainless steel, 1 inch by 3 inches, were prepared, cleaned and etched by the method of Guttman, Concise Guide to Structural Adhesives, Reinhold Publishing Corporation, New York, 1901, page 21. The powdered prepolymer of Example I was mixed with aluminum dust, or other additives, in a weight ratio of 1:1. This mixture was applied to a 0.5 inch section at the end of a stainless steel strip, either directly as the dry powder, or in the form of a piece of glass fabric impregnated with a solution of the prepolymer or with a melt of the adhesive.

Another steel strip was brought into abutting contact therewith, to provide a 0.5 inch overlap. This assembly was heated to about 300° C. for 2 hours under a constant pressure of 100 p.s.i. which converted the prepolymer to the corresponding high polymer. The average lap shear strength of these bonds was found to be 2000 p.s.i. at room temperature and 1100 p.s.i. at 300° C., as determined by ASTM–D–1002.

EXAMPLE III 1.301 grams of the tetraphenyl ester of 3,3',4,4'-diphenyl-oxide tetracarboxylic acid, which is of the formula

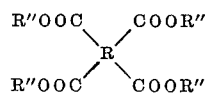

in which R is

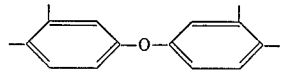

and R'' is phenyl, were mixed with 0.928 g. of 3,3'-diaminobenzidine. The prepolymerization was carried out under nitrogen at 200° C., as described in Example I. After 20 minutes the clear melt was cooled and ground to a fine powder. The prepolymer melt temperature was 100–120° C. and the inherent viscosity in phenol was less than 0.2. The lap shear strength of stainless steel bonds was 2000 p.s.i. at room temperature and 1200 p.s.i. at 300° C., as determined according to Example II.

EXAMPLE IV 1.324 grams of 3,3',4,4'-benzophenone tetracarboxylic acid tetraphenyl ester, which is of the formula

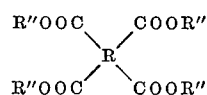

in which R is

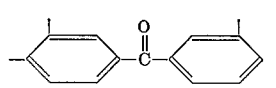

and R'' is phenyl, were mixed with 0.364 g. of 3,3',4,4'-tetramino-diphenyl methane, which is of the formula

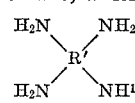

in which R' is

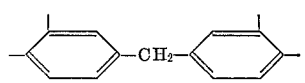

The mixture was heated under nitrogen at a constant temperature of 200° C. for 15 minutes. The dark red melt became very viscous. Finally it was cooled and powdered. This prepolymer had a softening point of 90–100° C. and an inherent viscosity of 0.08 in DMAc. Stainless steel lap joints were prepared according to the procedure described in Example II. After curing, the lap shear strength was found to be 2400 p.s.i. at room temperature and 1600 p.s.i. at 300° C.

I claim:

1. An amino-polyamide ester consisting essentially of recurring units of the formulae (a) 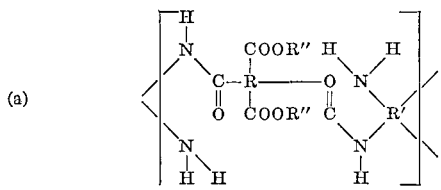

and (b) 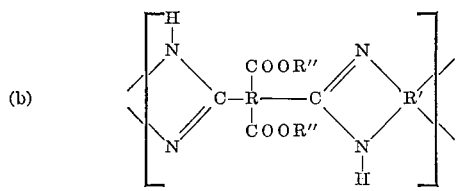

where R is a tetravalent carbocyclic aromatic radical, R' is a tetravalent carbocyclic aromatic radical, R'' is a monovalent aliphatic, cycloaliphatic, or carbocyclic aromatic radical, said polymer having a melting point between 50° C. and 250° C., and an inherent viscosity in phenol at 0.5 weight percent concentration and 30° C. of less than 0.2.

2. The polymer of claim 1 which has a melting point between 100° C. and 200° C.

3. The polymer of claim 1 wherein R'' is phenyl.

4. The polymer of claim 3 wherein R is

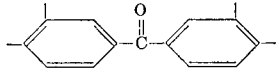

and R' is

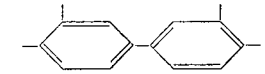

5. The polymer of claim 3 wherein R is

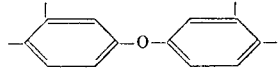

and R' is

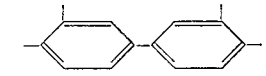

6. The polymer of claim 3 wherein R is

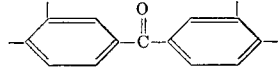

and R' is

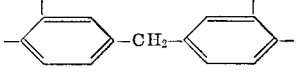

References Cited

UNITED STATES PATENTS

| | | | |
|---|---|---|---|
| 3,326,851 | 6/1967 | Tocker | 260—78 |
| 3,387,058 | 6/1968 | Levine | 260—78 |
| 3,414,543 | 12/1968 | Paufler | 260—78 |
| 3,435,004 | 3/1969 | Hathaway et al. | 260—78 |

OTHER REFERENCES

Bell et al., Journal of Polymer Science, vol. 3B (1965), pp. 977–984.

HAROLD D. ANDERSON, Primary Examiner

U.S. Cl. X.R.

161—227; 260—33.4, 65, 78

UNITED STATES PATENT OFFICE
CERTIFICATE OF CORRECTION

Patent No. 3,567,684         Dated March 2, 1971

Inventor(s) Gerfried Pruckmayr

It is certified that error appears in the above-identified patent and that said Letters Patent are hereby corrected as shown below:

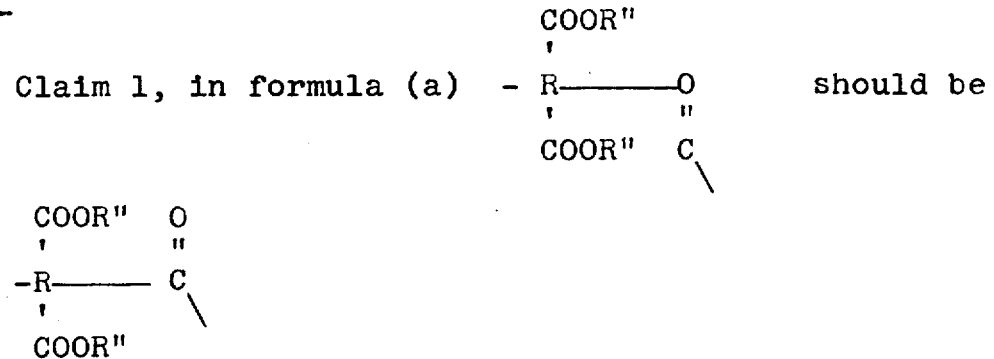

Signed and sealed this 15th day of June 1971.

(SEAL)
Attest:

EDWARD M. FLETCHER, JR.
Attesting Officer

WILLIAM E. SCHUYLER,
Commissioner of Paten